(12) United States Patent
Sella et al.

(10) Patent No.: US 8,949,949 B1
(45) Date of Patent: Feb. 3, 2015

(54) NETWORK ELEMENT AUTHENTICATION IN COMMUNICATION NETWORKS

(71) Applicant: Level 3 Communications, LLC, Broomfield, CO (US)

(72) Inventors: William Thomas Sella, Parker, CO (US); James Michael Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/178,036

(22) Filed: Feb. 11, 2014

(51) Int. Cl.
*H04L 29/06* (2006.01)
*H04L 9/32* (2006.01)

(52) U.S. Cl.
CPC ............ *H04L 63/0876* (2013.01); *H04L 63/06* (2013.01); *H04L 9/3247* (2013.01)
USPC ................... 726/4; 726/18; 726/21; 713/155; 713/163

(58) Field of Classification Search
None
See application file for complete search history.

(56) References Cited

U.S. PATENT DOCUMENTS

| | | | |
|---|---|---|---|
| 7,117,526 B1 * | 10/2006 | Short | 726/5 |
| 2008/0263647 A1 * | 10/2008 | Barnett et al. | 726/6 |
| 2009/0059809 A1 * | 3/2009 | Gould et al. | 370/252 |
| 2011/0299684 A1 * | 12/2011 | Young | 380/264 |
| 2012/0124367 A1 * | 5/2012 | Ota et al. | 713/153 |
| 2012/0324218 A1 * | 12/2012 | Duren et al. | 713/158 |

OTHER PUBLICATIONS

Sanzgiri, K. et al. A secure routing protocol for ad hoc networks, Network Protocols, 2002. Proceedings. IOth IEEE International Conference on Nov. 12-15, 2002.*

* cited by examiner

*Primary Examiner* — Saleh Najjar
*Assistant Examiner* — Jason Plotkin
(74) *Attorney, Agent, or Firm* — Sterne, Kessler, Goldstein & Fox PLLC

(57) ABSTRACT

In an embodiment, a method enables authentication of devices connected to a network. The method also enables the devices to digitally sign communication on the network with private keys. When a new device is added to the network, a mobile device may be connected to the new device. The mobile device receives identification from the new device and sends the identification to an authorization server, over a public network. The mobile device also sends a request for a private key to the authorization server. The authorization server contains an inventory of the devices authorized to communicate over the network. If the identification of the new device exists in the inventory, the authorization server sends a private key to the mobile device, over the public network. The mobile device forwards the private key to the new device.

28 Claims, 4 Drawing Sheets

NETWORK ELEMENT AUTHENTICATION IN COMMUNICATION NETWORKS

BACKGROUND

1. Field

This field is generally related to network security.

2. Related Art

Network services may, for example, provide connectivity from a customer network to another computer network, such as the Internet. As customer demand for connectivity increases, there is a need to expand network coverage. Expanding network coverage may include adding new network devices.

To prevent unauthorized addition of new devices to the network, the network may verify the identity of any new device when it is connected to the network. For example, a network server may contain an inventory of devices authorized to be connected to the network. This inventory can be, for example, a list of physical addresses of devices authorized to communicate on the network.

To further enhance security, the network may also require devices to encrypt their communication on the network. Such encryption may happen through an encryption key. Therefore a new device can communicate with the rest of the network only when it has a valid key. It is desirable, however, to efficiently and securely create and distribute encryption keys through the network. Also fast and efficient methods of obtaining the key are desirable for authorized new devices that are connected to the network.

BRIEF SUMMARY

In an embodiment, a method for authenticating a new switch on a first network is disclosed. In some embodiments, the method receives, at a mobile device via a direct connection to the new switch, an identifier that identifies the new switch. The method then transmits, via a second network, the identifier to an authentication server that determines, based on the identifier, whether the new switch is authorized to route data on the first network. In some embodiments the second network is a public network. When the authentication server determines that the new switch is authorized to route data on the first network, the authentication server sends the new switch a private key via the second, public network. The private key is used for encrypting and decrypting a discovery packet on the first network. The discovery packet advertises how to route data on the first network. The method configures, via the direct connection, the new switch with the private key to enable the new switch to digitally sign the discovery packet. The new switch transmits the digitally signed discovery packet on the network to another network element, where the other network element authenticates the discovery packet using the digital signature, and, when the other network element authenticates the discovery packet, the other network element starts routing data to the new switch.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As described above, a new switch may need to be authenticated prior to sending a new private key to the new switch. However it is also important to send the private key in a fast and efficient way. Embodiments enable the network to automatically authenticate the new switch and send the private key to the new switch over a network. Once the private key is sent to the new switch, embodiments use the private key to encrypt and decrypt, or digitally sign, discovery packets sent between the new switch and its neighboring switches.

Figure 1:
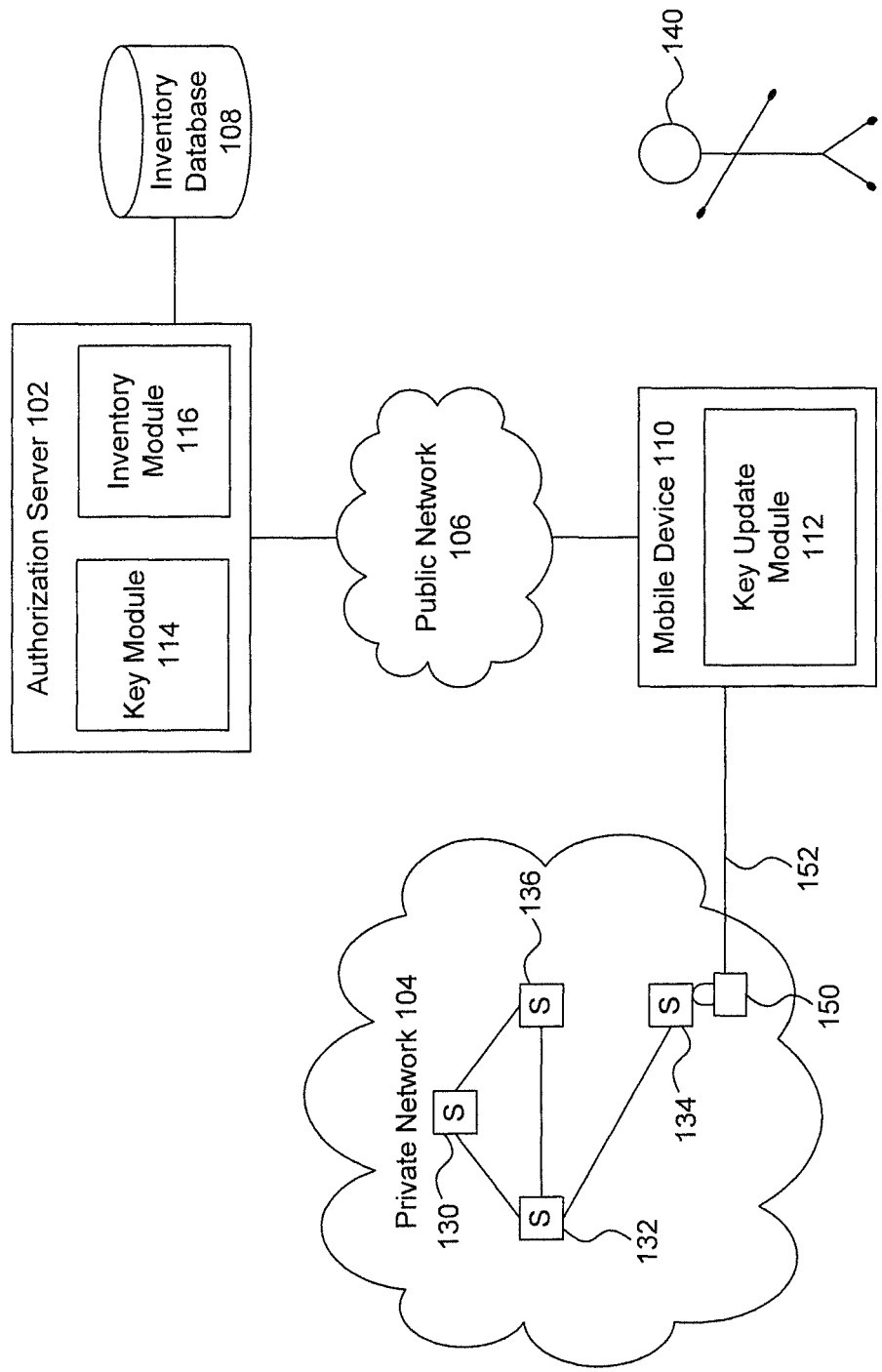
FIG. 1 is a diagram of a system for authenticating a new switch in the network.

FIG. 1 is a diagram showing a system 100 for authenticating a new switch in the network. System 100 includes two networks: a private network 104 and a public network 106. System 100 also includes a mobile device 110 and an authorization server 102. Each component is described below.

Private network 104 includes multiple switches, such as switch 130, 132, and 136. In this example, switch 134 is a newly connected switch to the network 104. New switch 134 is connected via a communication link to switch 132, making new switch 134 a neighbor to switch 132.

Authorization server 102 is configured to authorize a new switch to communicate over the private network 104. In an embodiment, authorization server 102 includes a key module 114 and an inventory module 116.

Inventory module 116 is configured to determine, based on an identifier of the new switch, whether the new switch is authorized to route data on the private network 104. The identifier of the new switch may, for example, be its media access control (MAC) addresses.

Inventory module 116 is connected to an inventory database 108 that contains a list of identifiers of switches that are authorized to communicate on private network 104. For example, inventory database 108 may be a list of MAC addresses of the authorized network switches. In that example, to authorize a new switch to communicate on private network 104, the MAC address of the new switch should be added to inventory database 108.

In addition to inventory module 116, authentication server 102 also includes key module 114. When authentication server 102 determines that new switch 134 is authorized to route data on the first network, key module 114 transmits a key to the switches in the private network 104. In some embodiments, key module 114 periodically creates a new private key. A private key generated by the key module 114, is communicated to all the authorized switches in the private network 104, including the new switch 134. A private key may have an expiration time. In particular, a private key may be valid from when it is created by the key module 114 and remain valid until it expires. Prior to expiration, key module 114 determines a new private key with a new, later expiration time. When a new switch is authenticated, key module 114 may select the most up-to-date key private key to send to the new switch. Alternatively, when a new switch is authenticated, key module 114 may send all valid keys to the new switch.

In some embodiments, to transmit a key to the new switch 134, key module 114 sends the key to mobile device 110 via public network 106. Public network 106 is different from private network 104. For example, public network 106 may be the public Internet. In embodiments, the new switch 134 is connected to the mobile device 112 via a connection 152. In the example embodiment of FIG. 1, connection 152 directly connects a port 150 on the new switch 134 to a key update module 112 in the mobile device 110.

Port 150 may be a Universal Serial Bus (USB) port. In addition, key update module 112 in mobile device 110 may be connected to the new switch 134 via other short-range communication protocols, such as Firewire, Wi-Fi and Bluetooth, etc. For additional security, the communication protocol may be such that a user of the mobile device must be in the physical presence of new switch 134. In some embodiments, a technician 140 must physically connect the new switch 134 to the mobile device 110.

After connecting to the new switch 134, key update module 112 requests identification from the new switch 134. The request may include credentials (such as a password from technician 140) to ensure that technician 140 is a trusted user. As mentioned above, the identification may be the MAC address of the new switch 134. In the embodiments, after receiving the new switch identification, key update module 112 connects to authorization server 102 over public network 106.

After connecting to authorization server 102, key update module 112 requests a private key from authorization server 102 for new switch 134. To request the private key, key update module 112 also sends the identification, for example the MAC address, of new switch 134 to the authorization server 102.

After receiving the request and new switch 134's identification from the key update module 112, authorization server 102 verifies whether new switch 134 is authorized to communication with private network 104. To verify whether new switch 134 is authorized to communication with private network 104, authorization server 102 may determine whether the identification of the new switch 134 is in the inventory database 108. In addition, authorization server 102 may also validate that: (1) a switch with that identification is not already connected to the network to avoid spoofing; (2) a new switch with that identification is anticipated to be connected to the network in the near term (for example, by having a valid time period for the new switch with its listing in inventory database 108); or (3) the new switch 134 is a connected to a particular location (e.g., a particular port on a particular switch) listed in inventory database 108 (e.g., that the new switch 134 is connected to switch 132 on a particular port).

If the authorization server 102 authorizes the new switch 134, key module 114 sends a valid private key to key update module 112. Key update module 112 forwards the valid private key to new switch 134 via connection 152 and port 150. Using the valid private key, new switch 134 is able to digitally sign discovery packets to its neighboring switches on communication network 104 and is able to decrypt packets from its neighboring switches. This allows the new switch 134 to communicate in the private network 104.

In one embodiment, each of the switches in private network 104 may determine its own routing tables, which specifies how it forwards data. In particular, the routing table specifies, for a given destination address, which port a switch should forward data to. In another embodiment, the function of determining the routing tables is done, not by the switch itself, but by a separate control device. This embodiment is illustrated in FIG. 2.

Figure 2:
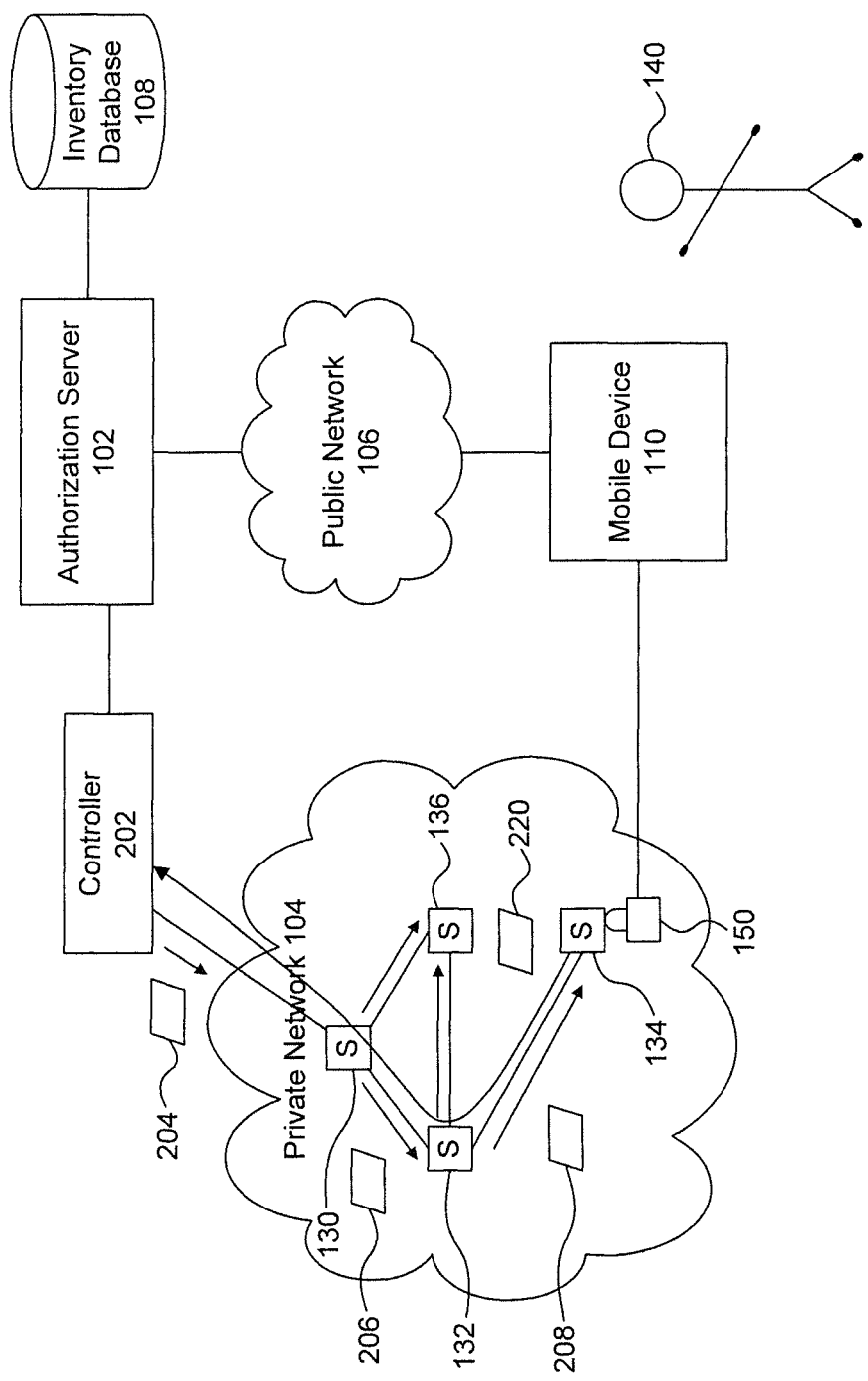
FIG. 2 is a diagram showing an example of encrypting and decrypting discovery packets by a new switch in the network.

FIG. 2 illustrates a system 200 that includes a controller 202 for configuring the switches on the network. As with system 100 in FIG. 1, system 200 also includes networks 104 and 106, authorization server 102, and mobile device 110.

Controller 202 provides intelligent routing for establishing a network connection. To do so, controller 202 requires knowledge of the topology and (possibly) the condition of the network links and devices. Based on that global knowledge, controller 202 may provide configuration commands to the various switches in private network 104 to configure the routing tables. The routing tables may be configured to route data having a particular destination to a particular physical port on the switch. Alternatively, the routing tables may be configured to route particular data flows (e.g., data having a particular protocol, source/destination address, and particular source/destination port) to a particular physical port on the switch. For the controller 202 to gain knowledge of the network, the controller 202 may flood discovery packets such as a discovery packet 204 to the switching devices.

Discovery packet 204 first reaches switch 130, because it is directly connected to controller 202. After receiving discovery packet 204, switch 130 may forward out the discovery packet on all its ports other than the port that received it. As switch 130 receives the control packet, and before forwarding it, switch 130 may make two modifications. First, it may add its own identifier (such as its MAC address) to the discovery packet. This address is added to an address field in the control packet for keeping track of all the forwarding devices the control packet travels through. Second, switch 130 may modify a performance metric in the control packet. The performance metric can include, for example, the delay in sending the discovery packet controller 202 to switch 130. This delay information may be collected, for example, using Link Layer Discovery Protocol (LLDP) packet exchanges. From switch 130, the re-forwarded packets may be sent onto switches 132 and 136, which are connected to switch 130.

Switches 132 and 136 may again re-flood the discovery packets in a similar manner. In this way, each switch can determine a path to the controller 130. Further, each switch can send its own discovery packets along the determined path to controller 202. These discovery packets inform controller 202 of the local topology. For example, these discovery packets sent from each switch may include a list of neighboring switches. Based on this information, controller 202 may reconstruct the topology.

In this way, by periodically sending discovery packets and receiving packets in return, controller 202 may automatically detect new switches as they are placed on the network and configure routes accordingly. However, the ease with which new switches may be added to the network may introduce security risks, particularly if the switches are not all located in areas where the network's service provider controls physical access.

Embodiments disclosed here provide a mechanism to mitigate this security risk. As described above, authorization server 102 first sends any new private key it generates, along with the expiration time of the key, to controller 202.

As the discovery packets flood through the network's switches in private network 104, each switch decrypts the discovery packets using one of the valid, or unexpired, private keys available to the switch. In the embodiments, after decrypting a discovery packet, network switch 130 discovers path information to and from controller 202 using the information in the discovery packets. The switch then updates the path information in the discovery packet and digitally signs it using one of the valid keys in the switch. The switch then floods the digitally signed discovery packet on its output ports, other than the port it received the discovery packet.

Using the path information in discovery packets, the network switches establish dedicated paths to and from the controller. Using such dedicated paths, the network switches send the network topology information to the controller. Controller 202 will therefore gather and model a topology of the network. Using this modeled network topology, controller 202 configures network switches to route data through network.

In an example, each time a new switch is connected to the network, a technician 140 connects the new switch 134 to a mobile device 110 via a port 150 on the new switch 134. In such embodiment, the mobile device connects the new switch 134 to the authorization server 102 via the public network 106. As described with respect to FIG. 1, authorization server 102 authenticates the new switch 134. In the embodiment, if the new switch 134 is authenticated, authorization server 102 sends a valid key to the new switch 134 using the connection via public network 106 and mobile device 110.

After the new switch 134 has a valid key, it can decrypt the discovery packets that it receives from its neighboring switches. Also, the neighboring switches of new switch 134 will be able to decrypt the packets the new switch 134 digitally signs by the valid key. Therefore, after being authorized and receiving a valid key, the new switch 134 can continue receiving the new keys generated by the authorization server 102, through the discovery packets.

As shown in the example embodiment of FIG. 2, controller 202 sends the discovery packet 204 to network switch 130. After gathering the path information of the discovery packet 204, switch 130 digitally signs and forwards the discovery packet on its ports to switch 132 and 136 using the private key. In a symmetric key security scheme, the packet may be digitally signed by encrypting it with the private key. Switch 132 receives discovery packet 206. Then, in the symmetric key scheme, switch 132 verifies the digital signature by successfully decrypting the packet using the same private key. Alternatively, when the packet is digitally signed using an asymmetric key security scheme, the digital signature is verified by successfully decrypting the packet using a public key corresponding to the private key. In addition to encrypting and decrypting the entire packet, some embodiments may only encrypt and decrypt a portion of the packet, such as a hash value generated from the packet.

After receipt and verification of the discovery packet, switch 132 forwards discovery packet 208 to the new switch 134. Discovery packet 208 is digitally signed by the switch 132 in a similar manner.

In the example embodiment, using the key new switch 134 from the authorization server over the public network 106, it decrypts the discovery packet 208. Using the key, new switch 134 also digitally signs the packets it sends to its neighboring switches. The neighboring switches, after verifying the validity of the digitally signed packets from the new switch 134, establishes a dedicated path from the new switch to the control device 202.

In the example embodiment of FIG. 2, a dedicated path over switches 132 and 130 to the controller is established for new switch 134. After establishing the dedicated path, new switch 134 sends the topology information of its neighborhood to the controller 202.

In an embodiment, controller 202 sends the new keys it receives from the authorization server 102, on the dedicated paths to network switches. Therefore new switch 134 also receives the new keys that authorization server 102 generates on the dedicated path from controller 202.

In an embodiment, each discovery packet sent from controller 202 is sent with the most-up-to-date private key. Alternatively, the discovery packet may be sent with all valid keys. In this way, as the discovery packet is reflooded through the switches, the switches can update their keys prior to expiration.

Figure 3:
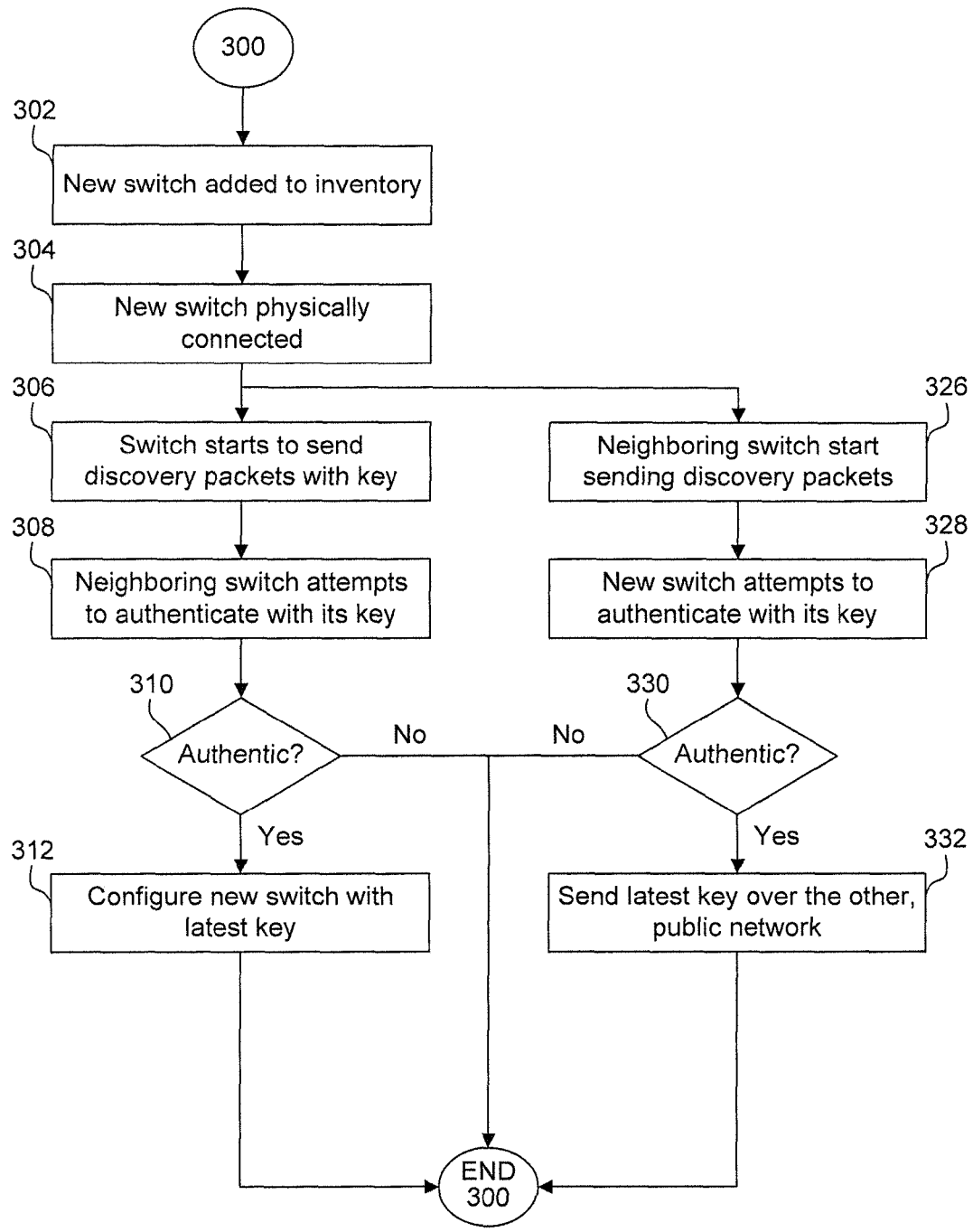
FIG. 3 is a flowchart of a method for authenticating a new switch by the neighboring devices of the new switch in the network.

FIG. 3 is a flowchart showing a method 300 for authenticating a new switch by the neighboring devices of the new switch in the network. In an embodiment, authentication by neighboring switches includes determining whether the new switch is authorized to establish a dedicated connection to the controller.

At step 302, an identification of a new switch is added to the inventory. In an embodiment, the identification is a MAC address, and the MAC address of the switch is added to the inventory.

At step 304, the new switch is physically connected to the network. The new switch may be connected to at least one neighboring switch. When the new switch is connected to the network, it will start sending discovery packets, digitally signed with a key, to at least a neighboring switch at step 306.

At step 308 the neighboring switch attempts to authenticate the discovery packets, sent by the new switch, with any of the unexpired keys available at the neighboring switch. If the neighboring switch, at decision blow 310, authenticates the discovery packet sent from the new switch, it will configure its routing table to forward packets to and from the new switch at step 312.

When the new switch is attached at step 304 not only does the new switch start sending packets out at step 306, the new switch's neighbors start also sending discovery packets to the new switch at step 326. The discovery packets sent by the neighboring switch are digitally signed.

The new switch at step 328 attempts to authenticate the discovery packet it receives from the neighboring switch. If the authentication at the new switch is successful at decision block 330, it will configure its routing table to forward packets to/from the neighboring switch at step 332.

Figure 4:
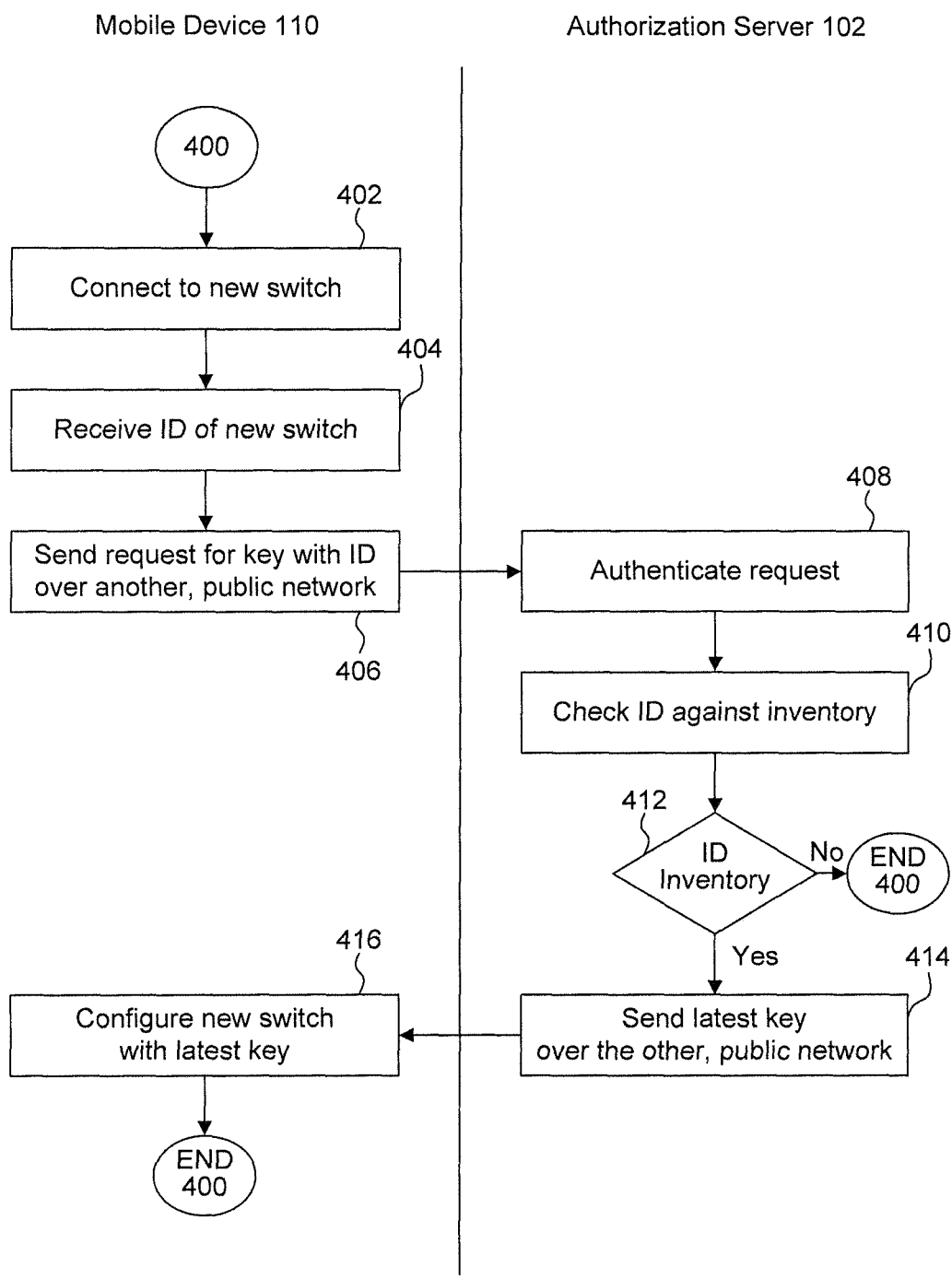
FIG. 4 is a flowchart of a method for sending a new key from the authentication server to the new switch in the network.

FIG. 4 is a flowchart showing a method 400 for sending a new key from the authentication server to the new switch in the network. While method 400 is described with respect to components in FIG. 1 for clarity, a skilled artisan would recognize that it can be used in other contexts as well.

At step 402, mobile device 110 connects to a new switch of a network. In an embodiment, a technician connects the new switch to mobile device 110. At step 404, mobile device 110 receives an identification of the switch, for example the MAC address, from the new switch.

At step 406, mobile device 110 sends the identification of the new switch along with a request for a new key, to the authentication server 102. In an embodiment, the request in step 406 is sent over another, public network.

At step 408, the authentication server 102 receives the authentication request from the mobile device 110. At step 410, the authorization server 102, checks the identification of the new switch against its inventory.

If the identification of the new switch is not in the inventory, method 400 ends. If the ID of the new switch is in the inventory, at step 414 the authorization server 102 sends a new key over the other, public network to the new switch.

At step 416, the new switch is configured with the latest key from the authorization server at step 414.

Each of the devices and modules in FIG. 1 or FIG. 2 may be implemented in hardware, software, firmware, or any combination thereof.

Each of the devices and modules in FIG. 1 or FIG. 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for authenticating a new switch on a first network, comprising:
   receiving, at a mobile device via a direct connection between the mobile device and the new switch, an identifier that identifies the new switch;
   transmitting, via a second network, the identifier to an authentication server that determines, based on the identifier, whether the new switch is authorized to route data on the first network, wherein the second network is a public network;
   when the authentication server determines that the new switch is authorized to route data on the first network, receiving, via the second, public network, a private key for a discovery packet on the first network, the discovery packet specifying how to route data on the first network; and
   configuring, via the direct connection, the new switch with the private key to enable the new switch to digitally sign the discovery packet, wherein the new switch transmits the digitally signed discovery packet on the first network to another network element, the other network element authenticates the discovery packet using the digital signature, and, when the other network element authenticates the discovery packet, the other network element starts routing data to the new switch.

2. The method of claim 1, wherein the private key is symmetric.

3. The method of claim 2, wherein the configuring comprises configuring the new switch with the private key to enable the new switch to decrypt a discovery packet from the other network element, the decrypted discovery packet indicating to the new switch how to route data on the first network.

4. The method of claim 3, wherein the other network element is a controller that determines a path through the first network thr a data stream, and configures a plurality of switches on the first network to route the data stream along the determined path.

5. The method of claim 4, wherein the discovery packet identifies additional switches that neighbor the new switch and wherein the controller uses the discovery packet to model a topology of the first network and determines the path based on the modeled topology.

6. The method of claim 4, wherein, in response to receipt of the discovery packet, the new switch requests a path be created to the controller.

7. The method of claim 4, wherein the discovery packet is from the controller and includes a new private key, the new private key enabling the new switch to decrypt additional discovery packets from the controller.

8. The method of claim 7, wherein the new private key has an expiration time.

9. The method of claim 8, further comprising:
   generating, by the authorization server, another private key before expiration time of the new private key; and
   including the other private key in another discovery packet.

10. The method of claim 1, wherein the direct connection is a USB, firewire, or a Bluetooth connection.

11. The method of claim 1, wherein the identifier is a media access control address of the new switch.

12. The method of claim 1, wherein the transmitting the identifier comprises sending a request to the authentication server, wherein the authentication server authenticates the request as from a trusted user.

13. The method of claim 1, wherein the configuring further comprises configuring via the direct connection and when a user of the mobile device is in physical presence of the new switch.

14. The method of claim 1, further comprises establishing, using information in the discovery packet, a dedicated path in the network.

15. A system for authenticating a device attached to a first network, comprising:
   a new switch on the first network configured to transmit via a direct connection an identifier that identifies the new switch;
   a mobile device configured to receive, via the direct connection, the identifier and transmits, via a second network, the identifier, wherein the second network is a public network, the direct connection being between the mobile device and the new switch;

an authorization server configured to receive the identifier from the mobile device via the second, public network and includes:

an inventory module configured to determine, based on the identifier, whether the new switch is authorized to route data on the first network, and a key module configured to transmit, when the authentication server determines that the new switch is authorized to route data on the first network, to the mobile device via the second, public network, a private key for a discovery packet on the first network, the discovery packet specifying how to route data on the first network, wherein the mobile device is configured to configure, via the direct connection, the new switch with the private key to enable the new switch to digitally sign the discovery packet, and wherein the new switch is configured to transmit the digitally signed discovery packet on the first network to another network element, the other network element authenticates the discovery packet using the digital signature, and, when the other network element authenticates the discovery packet, the other network element starts routing data to the new switch.

16. The system of claim 15, wherein the private key is symmetric.

17. The system of claim 16, wherein the private key enables the new switch to decrypt a discovery packet from the other network element, the decrypted discovery packet indicating to the new switch how to route data on the first network.

18. The system of claim 17, Wherein the other network element is a controller that determines a path through the first network for a data stream, and configures a plurality of switches on the first network to route the data stream along the determined path.

19. The system of claim 18, wherein the discovery packet identifies additional switches that neighbor the new switch and wherein the controller uses the discovery packet to model a topology of the first network and determines the path based on the modeled topology.

20. The system of claim 18, wherein, in response to receipt of the discovery packet, the new switch requests a path be created to the controller.

21. The system of claim 18, wherein the discovery packet is from the controller and includes a new private key, the new private key enabling the new switch to decrypt additional discovery packets from the controller.

22. The system of claim 21, wherein the new private key has an expiration time.

23. The system of claim 22, wherein the authorization server is further configured to:

generate another private key before expiration time of the new private key; and send the other private key to the controller for including in another discovery packet.

24. The system of claim 15, wherein the identifier is a media access control address of the new switch.

25. The system of claim 15, wherein the inventory module determines that the new switch is authorized to route data on the first network based on whether another switch with that identification is not already connected to the network.

26. The system of claim 15, further comprising:

an inventory database that stores an identification of switches anticipated to be connected to the network and a corresponding time when the respective switches are anticipated to be connected to the network, wherein the inventory module determines that the new switch is authorized to route data on the first network based on whether the inventory database indicates that the identification of the new switch is currently valid.

27. The system of claim 15, further comprising:

an inventory database that stores an identification of switches anticipated to be connected to the network and a corresponding location where the respective switches anticipated to be connected to the network, wherein the inventory module determines that the new switch is authorized to route data on the first network based on whether the inventory database indicates that the new switch is connected to the corresponding anticipated location.

28. A non-transitory program storage device tangibly embodying a program of instructions executable by at least one machine to perform a method for authenticating a new switch on a first network, the method comprising:

receiving, at a mobile device via a direct connection between the mobile device and the new switch, an identifier that identifies the new switch;

transmitting, via a second network, the identifier to an authentication server that determines, based on the identifier, whether the new switch is authorized to route data on the first network, wherein the second network is a public network;

when the authentication server determines that the new switch is authorized to route data on the first network, receiving, via the second, public network, a private key for a discovery packet on the first network, the discovery packet specifying how to route data on the first network; and configuring, via the direct connection, the new switch with the private key to enable the new switch to digitally sign the discovery packet, wherein the new switch transmits the digitally signed discovery packet on the first network to another network element, the other network element authenticates the discovery packet using the digital signature, and, when the other network element authenticates the discovery packet, the other network element starts routing data to the new switch.

* * * * *